(12) United States Patent
Woodhouse

(10) Patent No.: US 7,509,635 B2
(45) Date of Patent: Mar. 24, 2009

(54) SOFTWARE AND DATA FILE UPDATING PROCESS

(75) Inventor: David Woodhouse, Halstead (GB)

(73) Assignee: Red Hat, Inc., Raleigh, NC (US)

( * ) Notice: Subject to any disclaimer, the term of this patent is extended or adjusted under 35 U.S.C. 154(b) by 191 days.

(21) Appl. No.: 10/672,921

(22) Filed: Sep. 26, 2003

(65) Prior Publication Data

US 2005/0071371 A1 Mar. 31, 2005

(51) Int. Cl.
*G06F 9/44* (2006.01)

(52) U.S. Cl. ...................................... 717/168

(58) Field of Classification Search ......... 717/168–175, 717/100
See application file for complete search history.

(56) References Cited

U.S. PATENT DOCUMENTS

| | | | | |
|---|---|---|---|---|
| 5,446,888 | A | * | 8/1995 | Pyne ............................ 707/10 |
| 5,978,805 | A | * | 11/1999 | Carson ......................... 707/10 |
| 6,496,974 | B1 | * | 12/2002 | Sliger et al. .................. 717/106 |
| 6,952,823 | B2 | * | 10/2005 | Kryloff et al. ................ 717/170 |
| 7,366,824 | B2 | * | 4/2008 | Chiang ......................... 711/100 |
| 2004/0243992 | A1 | * | 12/2004 | Gustafson et al. ............ 717/168 |
| 2006/0130046 | A1 | * | 6/2006 | O'Neill ....................... 717/168 |

OTHER PUBLICATIONS

Andrew Tridgell, "Efficient Algorithms for Sorting and Synchronization", A thesis at The Australian National University, Feb. 1999, pp 1-106.*

Tridgell, et al., "The rsync algorithm", Joint Computer Science Technical Report Series, TR-CS-96-05, Department of Computer Science at the Australian National University, Jun. 1996, pp. 1-6.*
Moura et al. "Fast and flexible work searching on compressed text", Apr. 2000, ACM, TOIS vol. 18 Issue 2, pp. 113-139.*
Manku et al. "approximate Frequency Counts over Data Streams", Aug. 2002, VLDB Endowment , pp. 1-12.*
Tridgell, "Efficient Algorithms for Sorting and Synchronization", Thesis for The Australian National University, pp. 50-58 (1999).
Tridgell, et al., "The rsync altorithm", TR-CS-96-05, Joint Computer Science Technical Report Series, The Australian National University, (Jun. 1996).
Written Opinion and International Search Report dated Jun. 20, 2007, issued for PCT/US04/31079.

* cited by examiner

*Primary Examiner*—Wei Y Zhen
*Assistant Examiner*—Anna Deng
(74) *Attorney, Agent, or Firm*—Wilmer Cutler Pickering Hale and Dorr LLP

(57) ABSTRACT

A file updating process where a seed file is to be updated or revised to match a target file utilizes cached checking data to increase efficiency. Initially, target file checking data for one or more blocks of the target file are generated. These target file checking data are then stored to cache memory. In a similar manner, seed file checking data corresponding to one or more blocks of the seed file are generated. Then, during the updating process, the seed file checking data are compared with the target file checking data stored in memory to identify any differences between blocks of the seed file and blocks of the target file. If any differences are identified, the old seed file blocks are replaced with newly downloaded target file blocks. Alternatively, the old seed file blocks may be reconstructed in a manner such that they match the target file blocks.

19 Claims, 5 Drawing Sheets

SOFTWARE AND DATA FILE UPDATING PROCESS

FIELD OF THE INVENTION

This invention relates to techniques for updating computer files such as those pertaining to software programs and data and, more particularly, to the use of cached checking data to improve the efficiency of file updating processes.

BACKGROUND OF THE INVENTION

The "updating" or changing of software program files and data files is a normal process in computer science. For instance, updates or revisions to software programs and other files are routinely required to eliminate bugs found during usage or to add newly developed features. Sometimes these revisions may be relatively minor, involving changes in only a small percentage of the data that makes up the file. In other cases, the revisions may be much more extensive and require additional updating technique steps.

One way to update these files involves creating a completely new file containing all of the desired changes. These new files may then be distributed to the users to replace the existing files. In addition to physically distributing the files using floppy discs, CDs or DVDs, these relatively large files may be distributed from the software manufacturers to the users via a data communications network such as the Internet.

One obstacle to the frequent revision of large computer files by a manufacturer is the cost of delivering the updated file to the user. With new revised files, the amount of data can be substantial. For example, large files typically are as large as ten million characters (10 Megabytes) or larger. The distribution of such large files over a medium such as the Internet can take an undesirably long time from the point of view of the customer and can consume a large amount of server resources from the point of view of the file provider.

One solution to the problem of distributing large computer files over networks such as the Internet is the use of differencing programs or comparator algorithms. These applications compare an old file to a new revised file in order to determine how the files differ. Once identified, only the differences between the two files are transmitted.

One example of such a technique includes the "RSYNC" algorithm ("rsync"), which is utilizable with any conventional operating system including, for example, UNIX-like and Microsoft Windows operating systems. Rsync has proven to be extremely useful in comparing files whose content differs only partially. Generally speaking, rsync compares an original or "seed" file at a client computer with a revised or "target" file at a server and "notices" differences between the two files using checking data (e.g., checksums and the like). Specifically, rsync identifies these differences by generating checking data for blocks of the seed file at the client, which it uses to compare against checking data for blocks of the target file generated at the server. Matches in checking data indicate identical blocks, while differences suggest that changes have been made. Rsync then downloads only those parts of the target file that are actually new, while using any parts of the seed file that are unchanged from the target.

One drawback of the rsync algorithm is that generating the checking data at the server requires a large amount of processing by the server CPU. Thus, the server CPU may become overloaded when any more than just a few clients attempt to run the rsync algorithm. In these cases, the network bandwidth overload sought to be addressed by rsync is replaced with a CPU processing overload resulting in negligible improvements in the situation.

Another technique that is commonly used in the downloading of data, sometimes in conjunction with comparator algorithms like rsync, includes compression. Basically speaking, compression recognizes and eliminates redundancy in the data (i.e., repetitive or identical patterns of bits) to allow reductions in the amount of data to be stored or transmitted. Compression algorithms operate by generating a "history" associated with a piece of repetitive data. These histories are then referred to each time the repetitions are encountered to create a compressed form of the data. While compression is, in many cases, effective in reducing the amount of data to be transmitted, changes to just a few bytes in the beginning of an updated or revised file can result in a compressed file that is entirely different from the compressed version of a file to be updated (even though the uncompressed versions of the original file and revised file may be quite similar). As a result, this tends to defeat much of the optimization offered by comparator algorithms like rsync, which rely on similarities between the original and revised files.

SUMMARY OF THE INVENTION

The present invention provides a technique for updating software and data files using cached checking data to improve the efficiency of updating processes such as rsync and other similar algorithms. The technique is applicable in situations where checking data are used to identify differences in a seed file located at a client and a target file located at a server. In at least some embodiments, the technique of the present invention involves having the server generate target file checking data for one or more blocks of the target file. These target file checking data are then stored in a cache or other high-speed memory of the server, where it may be easily and rapidly accessed during an updating process. Subsequently, the client generates seed file checking data corresponding to one or more blocks of the seed file. Then, during the updating process, the server compares the seed file checking data with the target file checking data stored in memory to identify any differences between blocks of the seed file and blocks of the target file. If differences between the seed file and the target file are identified, the server transmits information to the client for revising the seed file blocks that are different from the target file blocks in a manner such that the seed file blocks match the target file blocks.

DETAILED DESCRIPTION OF THE PRESENT INVENTION

The present invention provides a technique for updating software and data files using cached checking data. The following description provides one example of an implementation of the technique of the present invention.

Figure 1:
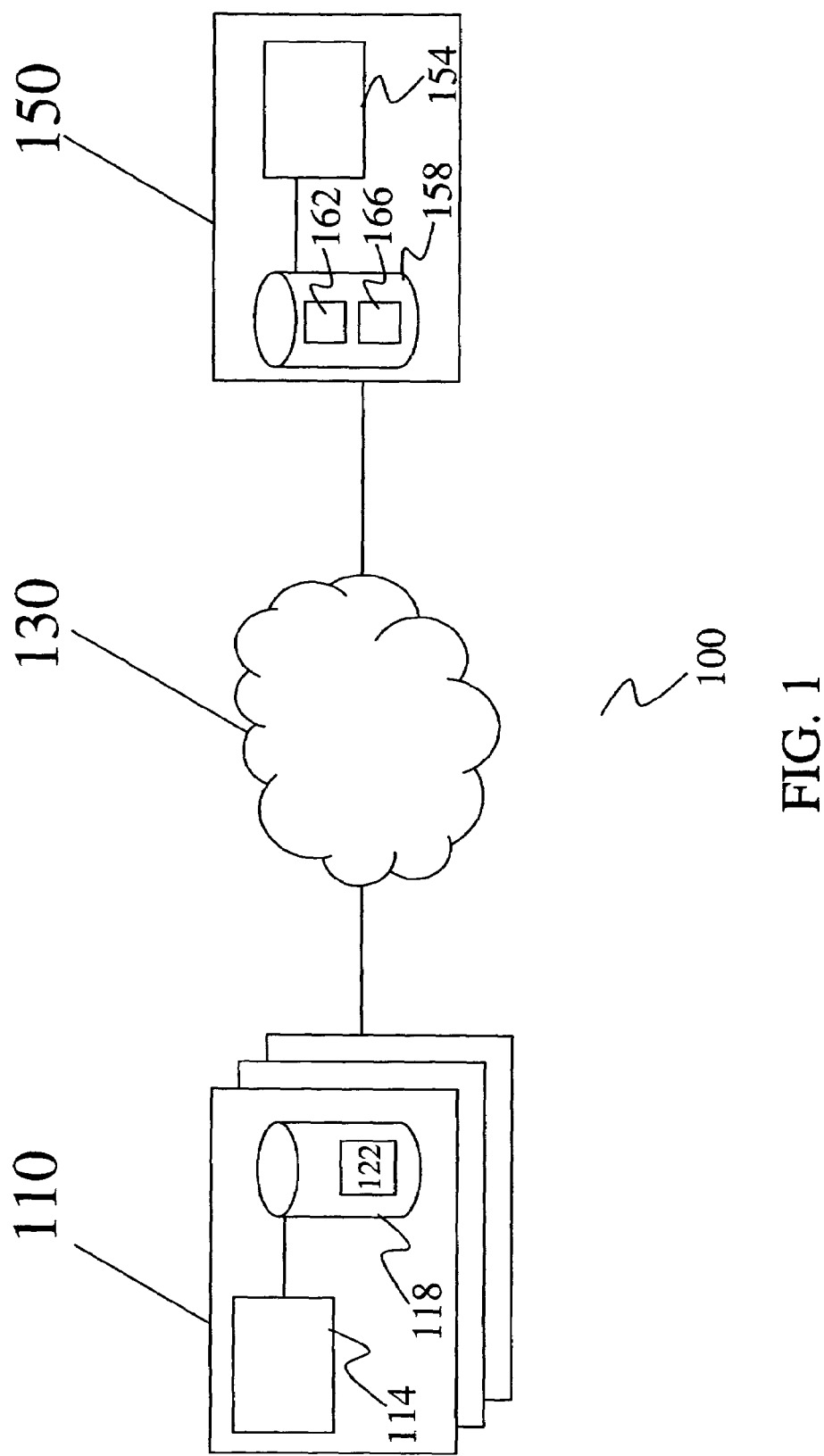
FIG. 1 is a block diagram illustrating an example of a networked computer system utilizable for implementing an updating process of the present invention.

FIG. 1 is a block diagram illustrating an example of a networked computer system 100 utilizable for implementing an updating process of the present invention. As shown in FIG. 1, system 100 includes a number of remote client systems (clients 110), which in this embodiment may include personal computers, laptop computers, personal digital assistants, cellular telephones, and other computing devices. Each of clients 110 includes, among other components, a processing unit (processor 114) and a number of memory storage devices (storage device 118). In typical cases, storage device 118 includes, for example, any type of permanent or semi-permanent storage (e.g., hard disc drives, memory cards, and the like) and may be used to store any number of software programs or data files 122, which from time-to-time may need to be updated or revised.

As also shown in FIG. 1, clients 110 may be linked to a server system or server 150 via a data communications network 130 to facilitate the transmission of information and data between clients 110 and server 150. Examples of network 130 may include the Internet or other similar data networks, such as private WANs, LANs and the like.

In the embodiment of FIG. 1, server 150 may represent, for example, a software manufacturer or vendor system from which software revisions may be distributed to clients 110. Like clients 110, server 150 also includes a processor 154 and a number of memory storage devices (e.g., hard disc and the like) (storage device 158). Storage device 158, in many cases, stores software programs or data files 162, which represent newer versions of corresponding programs or files implemented on clients 110. In addition, storage device 158 may also include a high-speed memory such as cache memory 166.

As mentioned above, files and programs 122 stored on clients 110 may be updated in a manner such that they match newer versions (e.g., file 162) stored on server 150. For example, file 162 may represent a newer version of a software program offered by a software vendor or manufacturer to customers or owners of older versions of the program (e.g., program 122). Thus, the newer versions of the program may be available for downloading from a server computer associated with the vendor (e.g., server 150) to the client computers (e.g., clients 110) via the Internet (e.g., network 130). In these and other embodiments, server 150 may perform a number of process steps to prepare for and execute the updating process of the present invention.

Figure 2:
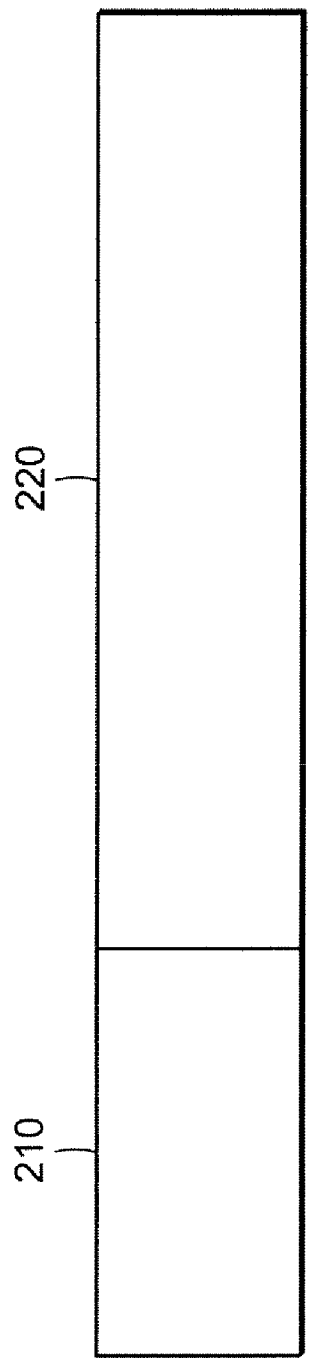
FIG. 2 depicts one example of a package file utilizable for transmitting software updates to a client computer.

In the context of software and data file updates, the files are typically implemented in conventional packages or packets which include a header and a payload (i.e., a compound file). For instance, FIG. 2 depicts one example of such a package which includes header 210 and payload 220. Whereas the payload includes the bulk of the file (e.g., the compressed software executables and the like), the header is used to identify the package and includes the package name, its version, the other packages on which it depends, and the like.

One specific example of a packaging system which may be utilized to compile such a package includes the RPM Package Manager, implementable for use with systems offered by Red Hat, Inc. of Raleigh, N.C. Although the examples provided in this description focus on the RPM Package Manager format (see, e.g., the example depicted in FIG. 2), it is to be understood that at least some embodiments of the present invention contemplate the use of other package formats, including those that omit header files as well as those that do not require the use of compression techniques.

Figure 3:
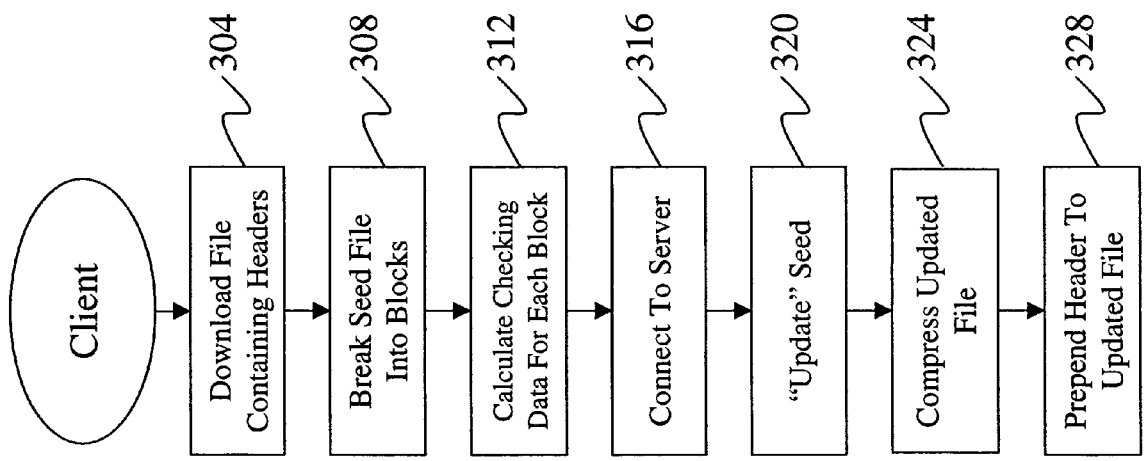
FIG. 3 depicts one example of a process utilizable for controlling operation of a client computer in conjunction with the updating process of the present invention.

Referring to FIG. 3, one example of a process utilizable for controlling operation of a client 104 in conjunction with the updating process of the present invention is depicted. Initially, after determining that revisions to file 122 are necessary (e.g., due to the discovery of bugs or other problems), client 104 downloads from server 150 a file containing a number of header files or headers (STEP 304). Thus, this downloaded header file, in some embodiments, may be used to identify the newer version of the program or file to be implemented onto client 104.

As mentioned above, the present invention makes use of a technique or algorithm that compares and identifies the differences between the program or file to be updated (e.g., file 122) and a newer version (e.g., file 162) (which, as discussed above, may be identified by, for example, the information included in the previously downloaded header file). The algorithm then downloads only the differences between the two files. In some embodiments, the algorithm compares a 'seed' file, which includes the file or files to be updated (i.e., file 122), against a 'target' file, which includes the file or files to be implemented on client 104 (i.e., file 162), to identify any differences. One specific example of an algorithm utilizable for determining the differences between the seed and target files is the RSYNC algorithm described in Andrew Tridgell, "The rsync algorithm" (Australian National University, 1996), which is incorporated herein by reference.

Accordingly, a seed file is prepared and separated into a number of blocks (STEP 308). Although any size and any number of blocks are possible, the seed file is typically separated into a series of non-overlapping fixed-sized blocks of between 500-1000 bytes. As will be discussed below, the present invention contemplates identifying differences between these blocks and similarly sized blocks of the target file, and subsequently revising any blocks with differences such that they match corresponding blocks of the target file.

To facilitate this comparison process, checking data are generated for each of the seed file blocks (STEP 312). These checking data are indicative of the content of an associated block, and may be used to identify the existence of changes in a block of data. For example, identical checking data between two versions of a block may suggest that the content of the block has not changed. On the other hand, different checking data may suggest that the block has undergone some type of revision. In many cases the checking data may include a simple error-detection scheme in which each block is associated with a numerical or other value based on the number of set bits in the block. Thus, if the numerical value is not the same in two blocks, it can be assumed that the content of the blocks also is not the same. In at least some examples, the checking data may include checksums associated with portions of the seed and target file blocks. Furthermore, multiple layers of checking data may be utilized. For instance, checking data that are relatively easy and quick to calculate may be generated for use in determining near or potential matches (i.e., weak or rolling checking data). Checking data that provide a stronger indication of a match but are more time consuming to calculate (i.e., strong checking data) may be generated to definitively confirm matches between only those blocks that have matching weak checking data. Blocks having identical sets of strong checking data may then be deemed to be identical. As an example, weak checking data may include a 32-bit checksum and strong checking data may include a 128-bit checksum.

After generating the checking data for the seed file, client 104 establishes a connection with server 150 (STEP 316). Subsequently, the process executes an updating process, one example of which is depicted below with reference to FIG. 5, for identifying and downloading the differences between the seed and target files (STEP 320). Once this updating process has been completed, the updated file is compressed using any suitable compression technique (STEP 324). From there, the file is appended to a corresponding header file previously downloaded, for example, in STEP 304 (STEP 328), thereby resulting in an updated copy of the file or files.

Figure 4:
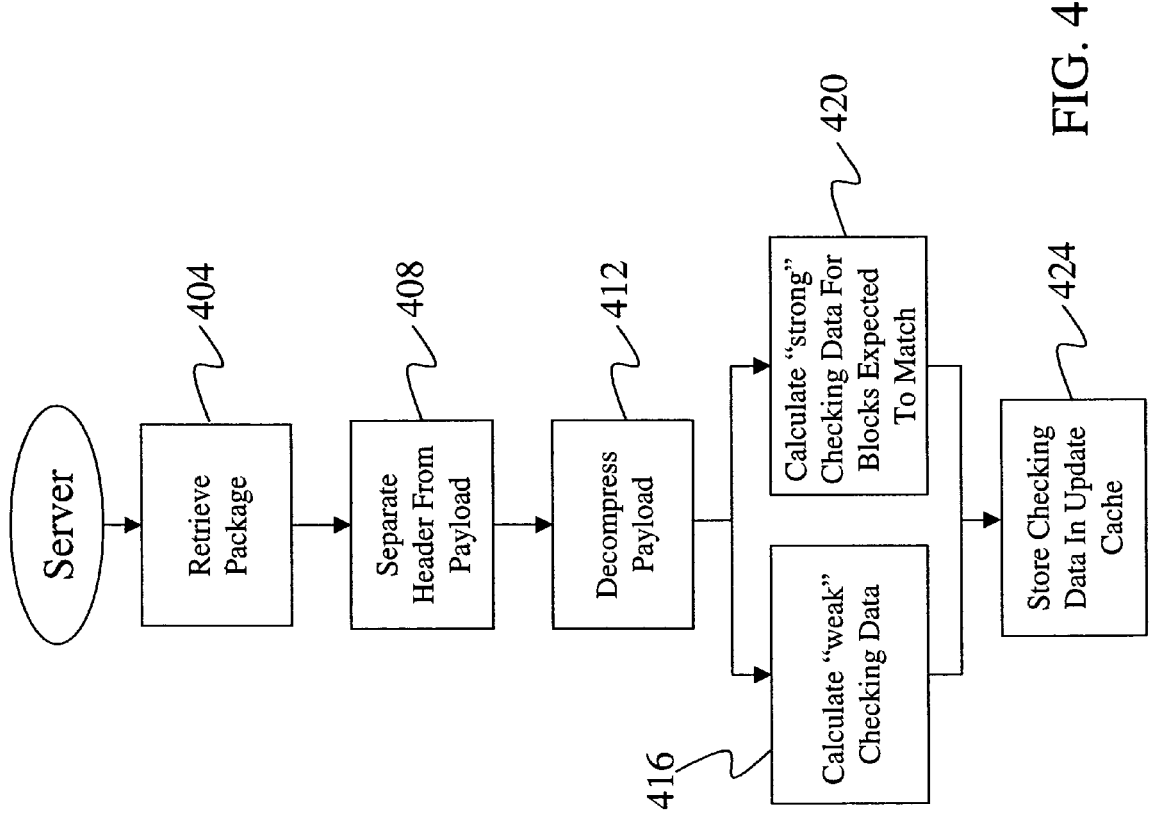
FIG. 4 depicts one example of a process utilizable for controlling operation of a server computer in conjunction with the updating process of the present invention.

FIG. 4 depicts one example of a process utilizable for controlling operation of a server computer in conjunction with the updating process of the present invention. Initially, server 150 retrieves file 162 from memory (STEP 404) and begins preparing a target file which will be compared against a seed file during the updating process. At this point, file 162 may resemble, for example, a typical RPM file (see, e.g., FIG. 2), and may include a header and a payload (which may or may not be compressed). Because the payload of file 162 constitutes the target file, it is separated from the header (STEP 408), and subsequently decompressed (STEP 412).

Once the payload of file 162 (i.e., the target file) has been decompressed, checking data for the target file may be generated. As discussed above, checking data may be generated for a number of blocks of the target file for use in comparing against blocks of the seed file. In particular, this checking data may include checksums associated with portions of the target file blocks. As with the seed file, several layers of checking data may be generated, including either or both of weak (e.g., a 32-bit checksum) and strong checking data (e.g., a 128-bit checksum) (STEP 416 and STEP 420).

The strong checking data, as discussed above, are relatively expensive to generate in the sense that they require a significant amount of processing time to calculate. The weak checking data, while easier to generate, nevertheless also require a significant amount of processing resources. Thus, the present invention contemplates storing these sets of checking data in a memory such as cache 166, where they may be analyzed without significantly affecting the performance of the server. In at least some embodiments of the present invention, both the weak and the strong checking data are cached. In other cases, since updates occur in limited areas of a file, it is possible to predict which blocks will match. Thus, in certain embodiments, only those sets of strong checking data expected to match are cached. Without having to generate strong checking data for all of the blocks, additional time savings may be realized.

The preparation of the target file (described above) may take place at any time. For example, in at least some embodiments, the process occurs during initial attempts to update client versions of program or data files. Other embodiments of the present invention contemplate performing the process before updating procedures are initiated by client systems.

Figure 5:
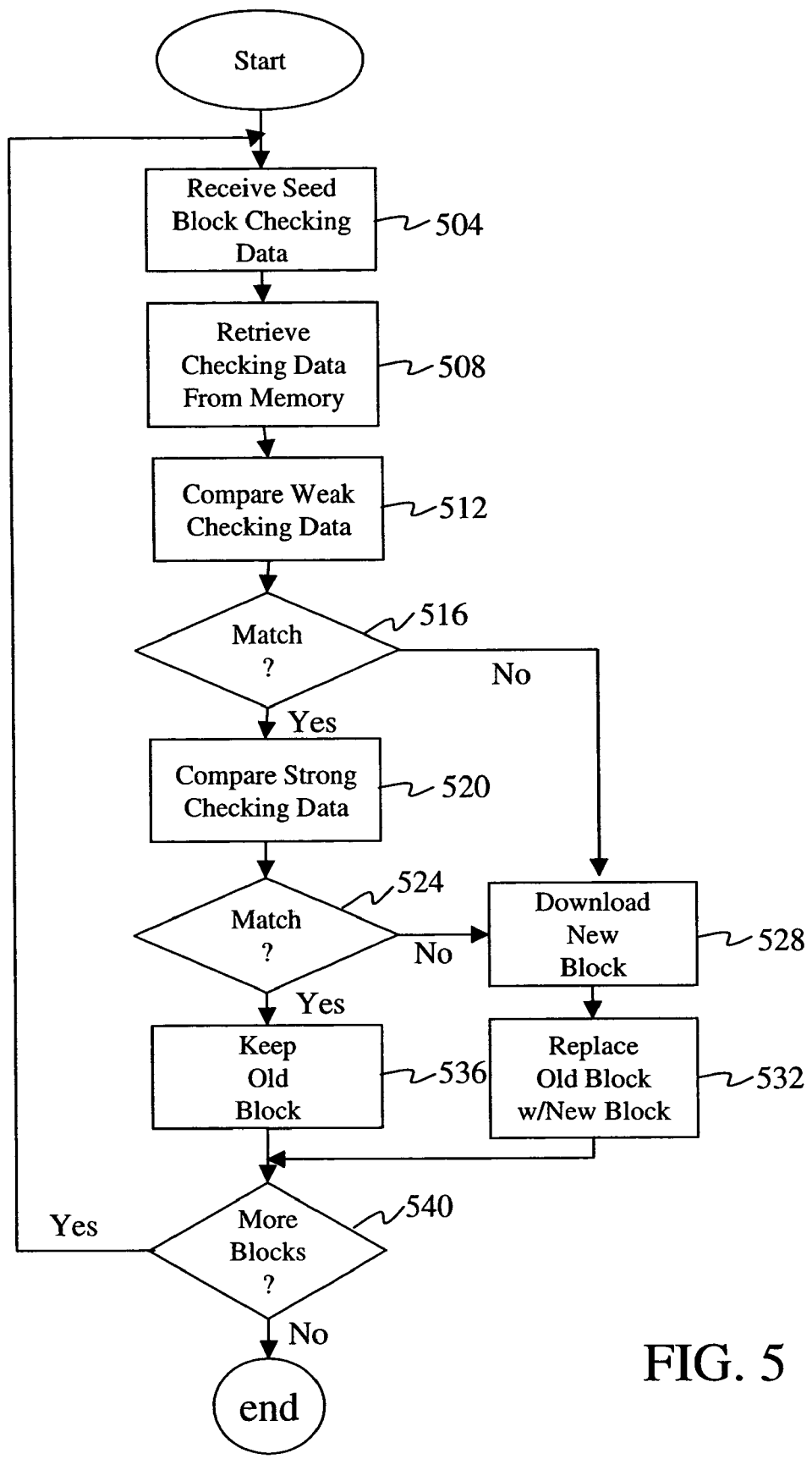
FIG. 5 depicts one example of an updating process of the present invention.

FIG. 5 depicts one example of an updating process of the present invention. In this example, after a connection has been established by one of clients 104 (e.g., STEP 316 in FIG. 3), processing starts with server 150 receiving the checking data associated with a seed block (STEP 504). Specifically, server 150 may receive both the weak checking data, as well as the strong checking data associated with a block generated by one of clients 104.

Subsequently, the checking data associated with the target file blocks are retrieved from memory 166 (STEP 508). In one example, this includes both weak checking data as well as strong checking data. In other examples, only the strong checking data expected to match are generated and stored. Hence, in these examples, only the strong checking data expected to match are retrieved along with the weak checking data. Server 150 then stores this checking data in any suitable data structure, such as for example any number of hash tables and the like, where the data may be easily retrieved for comparison.

After the checking data have been retrieved, the weak checking data for a block of the seed file received from one of clients 104 are compared against the weak checking data for the blocks of the target file (STEP 516). If the weak checking data for the seed and target file do not match, the process determines that the block of the seed file being analyzed has been revised and must be updated. In these situations, the process downloads the revised block from the target file of server 150 (STEP 528). The block of the seed file is then replaced with this newly downloaded block (STEP 532). In alternate embodiments, rather than downloading the entire revised block, instructions for constructing an accurate copy of the target file block may instead be transmitted. The details involved with downloading revised blocks as well as instructions for constructing an accurate copy of the block may be found in Andrew Tridgell, "The rsync algorithm" (1996).

If, on the other hand, the process determines that a match exists between the weak checking data of the seed and target blocks (STEP 516), the strong checking data (in this embodiment) is analyzed to confirm, more definitively, whether a match exists. Specifically, the strong checking data for the block of the seed file are compared against strong checking data for the block of the target file (STEP 524) to confirm whether the blocks are identical.

If the strong checking data for the block of the seed file match with the strong checking data of the block of the target file, the process concludes that the blocks are identical. In these situations, the process keeps the existing copy of the seed file block (STEP 536).

If the strong checking data do not match, the process concludes that the block of the seed file has been updated, and therefore requires revision. The process then downloads the revised block and uses it to replace the outdated seed file block (STEP 528 and STEP 532). The process continues in this manner until each of the blocks in the seed file has been considered (STEP 540).

In alternate embodiments, instead of receiving the seed block checking data in multiple steps and transmissions, the checking data corresponding to each of the blocks of the seed file (or subsets thereof) may be transmitted and received by server 150 prior to any comparisons. In these embodiments, processing returns to STEP 512 rather than STEP 504.

The updating process of the present invention may be implemented in a variety of forms, such as in software or firmware, running on a general purpose computer or a specialized device. The code can be provided in any machine-readable medium, including magnetic or optical disk, or in memory. Furthermore, the present invention is utilizable in conjunction with computer system that operates software which may require periodic updates, as well as any operating system (e.g., Linux, Unix, MS Windows, MacOS, etc.).

While there have been shown and described examples of the present invention, it will be readily apparent to those skilled in the art that various changes and modifications may be made without departing from the scope of the invention as defined by the following claims. For example, any number of levels of checking data may be used including the omission of either a strong or weak level. Specifically, embodiments of the present invention specifically contemplate situations where only a single form of checking data is utilized, such as, for example, a single 32-bit checksum. Accordingly, the invention is limited only by the following claims and equivalents thereto.

What is claimed is:

1. A computer-implemented method for updating a seed file to match a target file, said method comprising:

separating said target file into a header portion and a target file payload;

generating target file checking data for one or more blocks of said target file payload, wherein the generating includes, for each of the one or more blocks of said target file payload, retrieving the block from memory, decompressing the block of said target file payload, and calculating file checking data based on the decompressed block of said target file payload;

storing at least a portion of said target file checking data in a cache, wherein the cache is part of a non-volatile storage device;

receiving seed file checking data corresponding to one or more blocks of said seed file, wherein said seed file checking data is based on a decompressed version of the one or more blocks of said seed file;

comparing said seed file checking data with said target file checking data to identify differences in blocks of said seed file and blocks of said target file; and transmitting information for revising seed file blocks which are different from target file blocks such that said seed file blocks match said target file blocks.

2. The computer-implemented method of claim 1, wherein said target file checking data and said seed file checking data each comprise weak level checking data and strong level checking data, and wherein said comparing comprises comparing said weak level checking data and next comparing strong level checking data only if a match is identified in said weak level checking data.

3. The computer-implemented method of claim 1, wherein said target file checking data and said seed file checking data each comprise a 32-bit checksum and a 128-bit checksum.

4. The computer-implemented method of claim 1, wherein said target file checking data and said seed file checking data each comprise weak level checking data and strong level checking data, and wherein said storing comprises storing said weak level checking data associated with said target file and storing only said strong level checking data associated with said target file expected to match strong level checking data associated with said seed file.

5. The computer-implemented method of claim 1, wherein said target file checking data and said seed file checking data each comprise a checksum.

6. The computer-implemented method of claim 1, wherein said target file checking data stored in a cache are used with multiple updating requests received from a plurality of clients.

7. The computer-implemented method of claim 1, wherein said seed file is decompressed prior to said generating, wherein said seed file blocks are revised in accordance with said transmitted information to match said target file blocks, and wherein said revised seed file blocks are recompressed after revising.

8. The computer-implemented method of claim 7, wherein said seed file comprises a compressed payload, previously separated from a compound file, and wherein said revised seed file is appended to a header file after said recompressing to constitute a revised compound file.

9. The computer-implemented method of claim 8, wherein said compound file and said revised compound file comport with an RPM Package Manager format.

10. A computer-implemented method for updating a seed file to match a target file, wherein said seed file comprises a compressed payload, previously separated from a compound file, said method comprising:

constructing said seed file to maximize similarities with said target file;

decompressing said seed file;

generating seed file checking data for one or more blocks of said seed file, wherein said seed file checking data is based on a decompressed version of the one of the one or more blocks of said seed file;

transmitting said seed file checking data for comparison against cached target file checking data corresponding to one or more blocks of said target file to identify differences in blocks of said seed file and blocks of said target file, wherein the cached target file checking data is cached in a cache that is part of a non-volatile storage device; and receiving information for revising seed file blocks which are different from target file blocks such that said seed file blocks match said target file blocks;

revising said seed file blocks in accordance with said information to match said target file blocks;

recompressing said revised seed file blocks, and appending said revised seed file blocks to a header file after said recompressing to constitute a revised compound file.

11. The computer-implemented method of claim 10, wherein said compound file and said revised compound file comport with an RPM Package Manager format.

12. A computer program product, residing on a computer-readable medium, for use in updating a seed file to match a target file, said computer program product comprising instructions for causing a computer to:

separate said target file into a header portion and a target file payload;

generate target file checking data for one or more blocks of said target file payload, wherein the generating includes, for each of the one or more blocks of said target file payload, retrieving the block from memory, decompressing the block of said target file payload, and calculating file checking data based on the decompressed block of said target file payload;

store at least a portion of said target file checking data in a cache, wherein the cache is part of a non-volatile storage device;

receive seed file checking data corresponding to one or more blocks of said seed file;

compare said seed file checking data with said target file checking data to identify differences in blocks of said seed file and blocks of said target file; and transmit information for revising seed file blocks which are different from target file blocks such that said seed file blocks match said target file blocks.

13. The computer program product of claim 12, wherein said target file checking data and said seed file checking data each comprise weak level checking data and strong level checking data, and wherein said computer program product further comprises instructions for causing said computer to compare said weak level checking data and to compare said strong level checking data only if a match is identified in said weak level checking data.

14. The computer program product of claim 12, wherein said target file checking data and said seed file checking data each comprise weak level checking data and strong level checking data, and wherein said computer program product further comprises instructions for causing said computer to store said weak level checking data associated with said target file and to store only said strong level checking data associated with said target file expected to match strong level checking data associated with said seed file.

15. The computer program product of claim 12, wherein said target file checking data and said seed file checking data each comprise a checksum.

16. A computer program product, residing on a computer-readable medium, for use in updating a seed file to match a target file, wherein said seed file comprises a compressed payload, previously separated from a compound file, said computer program product comprising instructions for causing a computer to:
- construct said seed file to maximize similarities with said target file;
- decompress said seed file;
- generate seed file checking data for one or more blocks of said seed file;
- transmit said seed file checking data for comparison against cached target file checking data corresponding to one or more blocks of said target file to identify differences in blocks of said seed file and blocks of said target file, wherein the cached target file checking data is cached in a cache that is part of a non-volatile storage device; and
- receive information for revising seed file blocks which are different from target file blocks such that said seed file blocks match said target file blocks;
- revise said seed file blocks in accordance with said information to match said target file blocks;
- recompress said revised seed file blocks, and
- append said revised seed file blocks to a header file after said recompressing to constitute a revised compound file.

17. The computer-implemented method of claim 10, wherein said step of constructing said seed file utilizes data that is locally stored.

18. The computer-implemented method of claim 17, wherein said seed file is a compound file comprising existing versions of individual files.

19. A system for updating a seed file to match a target file, wherein said seed file comprises a compressed payload, previously separated from a compound file, said system comprising:
- a client computer that constructs said seed file to maximize similarities with said target file, (ii) decompresses said seed file, and (iii) generates seed file checking data corresponding to one or more blocks of said seed file;
- a server that generates target file checking data for one or more blocks of said target file, receives said seed file checking data, compares said seed file checking data with said target file checking data to identify differences in blocks of said seed file and blocks of said target file and transmits information to said client computer for revising seed file blocks which are different from target file blocks such that said seed file blocks match said target file blocks; and a non-volatile storage device associated with said server to store at least a portion of said target file checking data in a cache;
- wherein the client computer (i) receives the information for revising seed file blocks, (ii) revises said seed file blocks in accordance with said information to match said target file blocks; (iii) recompresses said revised seed file blocks, and (iv) appends said revised seed file blocks to a header file after said recompressing to constitute a revised compound file.

* * * * *